United States Patent

[11] 3,581,972

| [72] | Inventors | Norbert Buchner<br>Beutelsbach;<br>Adolf Vogele, Magstadt; Rolf Kohnlein,<br>Korntal, all of, Germany |
|---|---|---|
| [21] | Appl. No. | 804,181 |
| [22] | Filed | Mar. 4, 1969 |
| [45] | Patented | June 1, 1971 |
| [73] | Assignee | Fr. Hesser Maschinenfabrik A.G.<br>Postfach and Stuttgart, Bad Canstatt,<br>Germany |
| [32] | Priority | Mar. 7, 1968 |
| [33] | | Germany |
| [31] | | P 16 11 933.8 |

[54] PACKAGING CONTAINER WITH PROTECTED OVERLAP SEAM AND METHOD FOR MAKING SAME
21 Claims, 20 Drawing Figs.

[52] U.S. Cl. .................................................. 229/4.5,
229/5.7, 229/48, 93/77

[51] Int. Cl. .................................................. B65d 3/00,
B65d 5/42

[50] Field of Search .......................................... 229/4.5,
5.5, 5.6, 5.7, 48, 3.5, 21, 93; 220/60, 66, 67; 93/77

[56] References Cited
UNITED STATES PATENTS

| 3,146,930 | 9/1964 | Elam | 229/4.5 |
| 3,195,795 | 7/1965 | Wilcox | 229/7 |
| 3,365,111 | 1/1968 | Mc Nair, Jr. et al. | 229/17G |

*Primary Examiner*—David M. Bockenek
*Attorney*—Edward E. Sachs

ABSTRACT: A tubelike packaging container of multilayer material provided with an overlap seam which is protected by a multilayer cover band disposed between the seam margins.

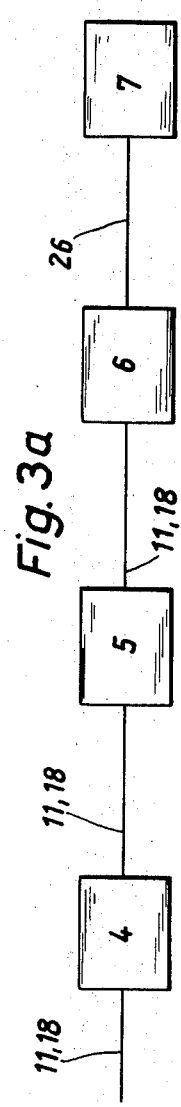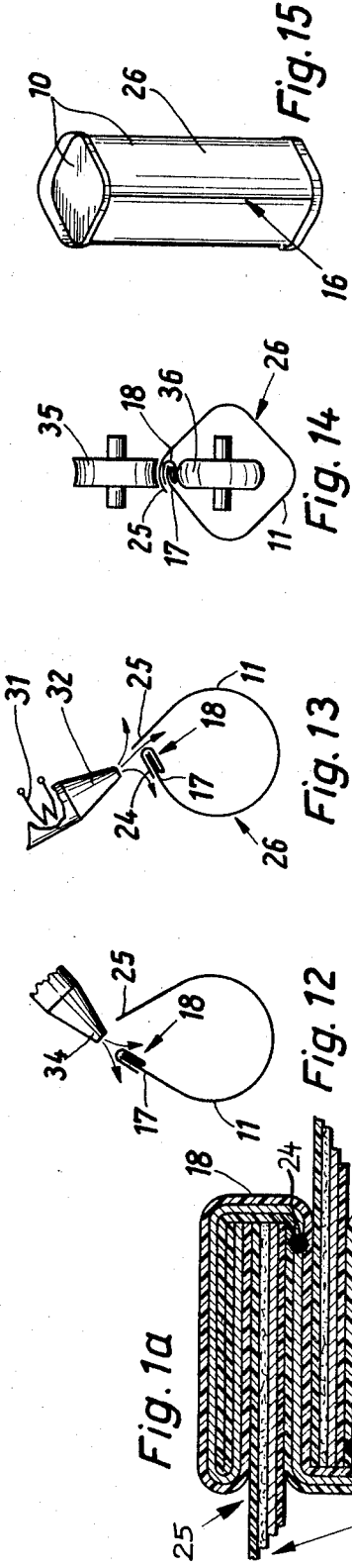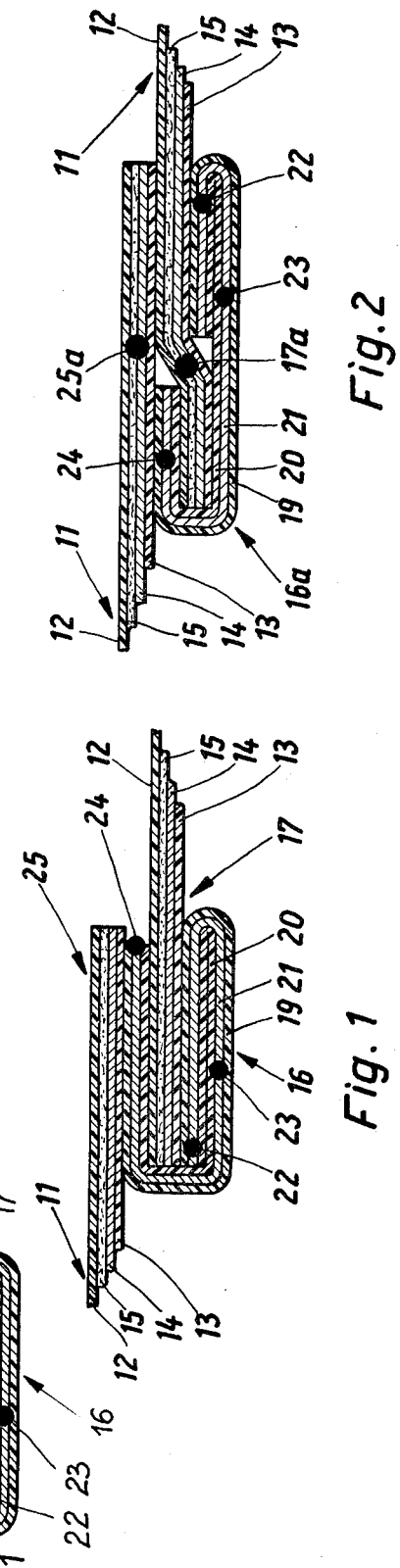

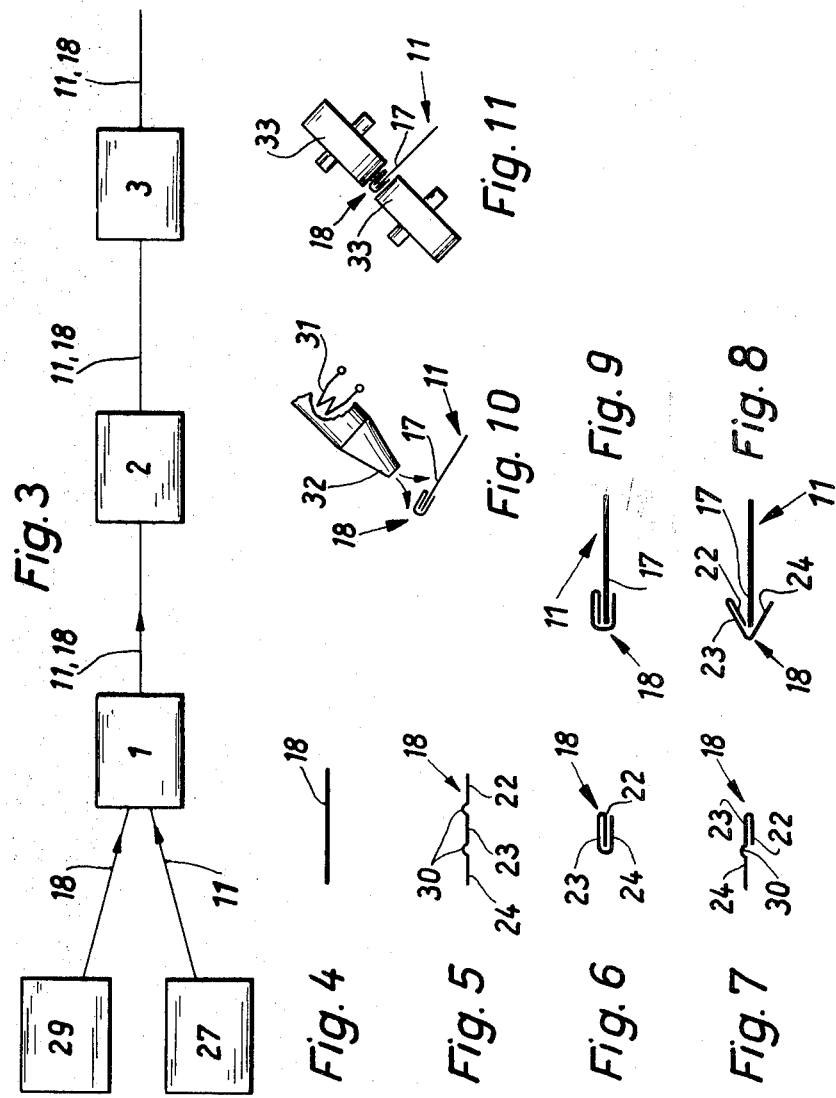

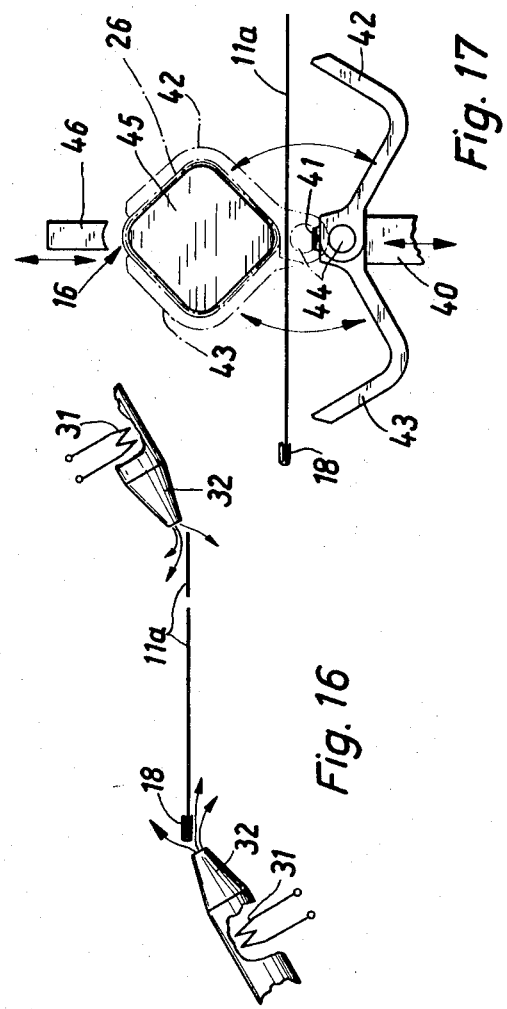

PACKAGING CONTAINER WITH PROTECTED OVERLAP SEAM AND METHOD FOR MAKING SAME

The invention relates generally to a packaging container and, more particularly, to tubelike containers having overlapping seam margins which are protected by a cover band, and the invention relates to the method for making same.

In multilayer packaging containers it is in many instances desirable to protect the overlap seam with a cover band in order to avoid undesirable or even damaging impact to and between the package content and the inwardly exposed cutting edges of the individual layers of packaging material.

In order to protect these cutting edges, it has already been proposed to weld upon the overlap seam a strip of material, composed of the same material as the layer of the packaging material which comes into contact with the fill good on the inner side of the packaging container. The welding of such a strip has, however, been found to be rather difficult because in partly finished packaging containers the access to the cutting edge, which is to be protected, is rather poor. Moreover, the cover band which is comprised of only one layer of thermoplastic material is very readily squashed, along the cutting edge which is to be covered, and as a consequence thereof, the same does not fulfill the purpose for which it is intended. Additionally, such strips are composed of a single material and are usually not impervious to oxygen in the required manner.

In order to avoid these disadvantages of the prior art, it is suggested in accordance with this invention, that the cover band be composed of a carrier foil and at least one layer of plastic material which can be welded to the inner layer of the packaging container and can be secured to the seam, in such a manner, that part of the strip width lies between the two seam margins and the other part extends around the cutting edge of the seam margin located within the container and abuts the inner side of the margin. This is accomplished by folding a strip portion 180° against itself.

This new construction and arrangement of the cover band has the advantage that the strip is not squashed during the sealing of the seam and a trouble-free seal can be established since, basically, two seal-responsive layers are placed on one another.

In order to obtain a strong bond or connection between the inner and outer layer of the container and the cover band, also when the outer layer of the container is not heat seal responsive, or only marginally heat seal responsive, there is proposed in accordance with another aspect of this invention, that also the other side of the cover band be provided with a layer of plastic material which can be heat sealed to the outer layer of the container.

In cases where the container is exposed to moisture which acts from the outside, the cover strip may, in accordance with another aspect of this invention, be placed around the cutting edge of the outer seam margin and may be welded therewith. In an appropriate case this outer band portion may again be folded 180° against itself.

The application and interposition of such a multilayer cover band to and between the seam margins, may be carried out during the fabrication of the container body, in which a movable web of packaging material, or a blank which is separated from such web, is progressively formed during the forward movement of the web into a tubelike configuration with a predetermined cross section and is provided with a longitudinal seam.

In order to establish trouble-free and controllable conditions in high capacity machines relative to the welding temperatures and plastification of the multilayer seam, which affects the mechanical characteristics of the machines, there is suggested in accordance with another embodiment of this invention, that the cover band be initially welded to the inner seam margin, after which the seam is cooled and then heat welded to the outer seam margin.

To facilitate the application of the cover band to the inner seam margin, it has been found to be particularly helpful that the cover band be initially grooved and then folded twice, each 180° around these grooves, after which one of the folds is opened and the strip portion with the opening is then placed upon the seam margin.

The steps in accordance with this invention provide sufficient security and enables the selection of the most advantageous weld temperature range for the overlapping seam, so that an efficient operation and trouble-free insertion of the seam portions between the welding tools can be established.

It is therefore the primary object of this invention to provide a container in which the multilayer overlap seam is protected by a cover band from the influences of the container content, such as fruit juice for example, which can soften and ultimately damage the container usually by initially attacking from the exposed cutting edges of the seam margin.

It is a further object of this invention to provide a method for making a cover band and interposing such band between the inner and outer seam margins.

An aspect of the present invention resides in the provision of a tubelike packaging container composed of a multilayer packaging material having an inner and an outer seam margin in overlapping and spaced relationship to each other. And a multilayer cover band with a forward end interposed, at least in part, between the seam margins, and the intermediate and rear portion thereof being telescoped around the cutting edge of the inwardly facing seam margin, with the rear portion being folded 180° against itself with the folded portion abutting the inwardly facing seam margins.

Another aspect of the present invention resides in the provision of a method for making a packaging container with a protected overlap seam, in which the cover band is welded to and around the cutting edge of the inner seam margin and the weld or seal is then intermediately cooled prior to heat sealing the outwardly extending face of the cover band to the outer seam margin.

For a better understanding of the present invention, together with other and further objects thereof, reference is had to the following description taken in connection with the accompanying drawings, and its scope will be pointed out in the appended claims.

In the drawings:

FIG. 1 is a cross-sectional view of the overlapping seam margins and the interposed cover band;

FIG. 1a is a view similar to FIG. 1 showing an extended modified cover band;

FIG. 2 is a view similar to FIG. 1 showing a modified arrangement of the inner seam margin and cover band;

FIG. 3, continued on FIG. 3a, shows diagrammatically the method for protecting an overlap seam in accordance with this invention;

FIG. 3b is a view similar to FIG. 3 showing a modification of the method;

FIGS. 4 to 15 are schematic and in part perspective views illustrating the sequence of fabricating the overlapping seam in accordance with the method of FIGS. 3 and 3a;

FIGS. 16 and 17 are schematic and in part perspective views illustrating modified steps for producing an overlap seam from a discontinuous web according to FIG. 3b.

Turning now to the drawings and particularly to FIGS. 1 and 15, there is shown a packaging container 10 for fill goods such as, for example, fruit juices or the like, which, in order to prevent a deleterious effect upon the quality thereof until use, must be protected, particularly against the penetration of oxygen into the container.

The container 10 is comprised of a multilayer packaging material 11 which includes, for exemplary purposes, inner and outer cover layers 12 and 13, both of which are comprised of polyethylene, with an aluminum layer 14 and a paper layer 15 disposed therebetween. The transverse ends of the container 10 constitute inner and outer seam margins 17 and 25 which are placed in overlapping but spaced relationship.

In the absence of measures for protecting the overlapping seams 17 and 25 of packaging containers 10, the fruit juice tends to soften the paper layer 15 starting at the cutting edge which faces the seam margin 17, and in this manner slowly destroys the packaging material 11 and with that the packaging container 10. Furthermore, it causes the fruit juice, due to the contact with the aluminum foil 14, to be reduced in quality.

In order to avoid such disadvantages a multilayer cover band 18 is attached to and interposed between the seam margins 17 and 25. The cover band 18 has a forward portion 24, an intermediate portion located between the latter and rear portions 22 and 23. The cover band 18 comprises a carrier foil 21 and layers 19 and 20 of plastic material which are suitably secured to the foil and are heat sealable to cover layers 12 and 13 and are preferably composed of the same material. To establish good oxygentight integrity of the overlap seam 16 and to provide for suitable handling of the cover band 18, the carrier foil 21 is composed of aluminum or some other suitable metallic material.

In order to avoid undesirable interaction between the reinforcing foil 21, of the cover band 18, and the contents of the container, similar to the problems arising with respect to the packaging material 11, the cover band 18 is arranged at the overlapping points with the packaging material 11 in a unique manner in accordance with this invention.

In this arrangement the longitudinal edge of the cover band 18 is secured to a transverse portion of part 22, either near or extending from the cutting edge of the seam margin 17 which faces the inner side of the container, the other parts 23 and 24 of the width of the transverse portion of cover band 18 are folded 180° towards the aforementioned cutting edge, and the portion 24 extends beyond the cutting edge of the seam margin and is folded another 180° around the cutting edge, in such a manner, that the last mentioned part 24 of the width of the cover band 18 projects between the inner and outer seam margins 17, 25 where the same is at least welded to the latter. The sealing of part 24 to both seam margins 17 and 25 must, in each case, be undertaken when the width of part 24 constitutes a considerable portion of the overlap of the seam margins 17 and 25, the two latter margins being completely separated by part 24, as shown in FIG. 1. In the last mentioned example according to FIG. 1, the parts 22, 23 and 24 are of substantially equal width.

In order to assure, in accordance with another embodiment of this invention, that in the case of an overlapping seam 16a, which is characterized in that the parts 22 and 24 together are smaller than the part 23, (see FIG. 2), a reliable transmission of forces is obtained from the seam margin 17a to the other seam margin 25a, particularly in the case when the width of the part 24 constitutes a considerable portion of the overlap of seam margin 17a and 25a, there is preferably also utilized a cover band 18, the carrier foil 21 of which is provided on both sides with a plastic layer 19 and 20. The cover band 18 is sealed with the assistance of these plastic layers 19 and 20 onto both seam margins 17a and 25a.

In this embodiment according to FIG. 2, the cutting edge of the forward portion 24 is located remote from the cutting edge of the outer seam margin 25, and a part of the inner seam margin 17 is located between these two cutting edges in a coplanar relationship with the forward portion 24. The intermediate portion of margin 17, located between the section spaced relative to margin 25 and the section abutting margin 25, is arranged askew relative to these two contiguous parts of the seam margin 17.

The construction described in the preceding paragraph relating to overlapping seam 16a is desired, however, only when the outer and inner side of the packaging container 10 is composed of the same material, because, as is conventionally known, the bonding of dissimilar materials does not always give the desired strength of material.

In the fabrication of tubelike bodies 26 for packaging containers 10 having an overlapping seam 16, according to FIG. 1, the process starts with a supply holder 27, see FIG. 3, supplying an endless web of packaging material provided with suitably cut margin edges. The cover band 18 which is similarly received from an endless web of material from a supply holder 29.

The cover band 18 which is drawn from the supply holder 29 (see FIG. 4) is, at the first process station 1, see FIG. 3, initially provided with two parallel and longitudinally extending grooves 30, in such a manner, that the same is divided into a center, striplike part 23 and two parts 22 and 24 adjoining the center part 23 (see FIG. 5). The grooves may, for instance, be imparted into the web by means of generally known rollers which are not illustrated.

At the first processing station 1 the cover band 18 is additionally folded continuously along the groove 30 by means of a fold guide, which is not shown, which is effective to fold the parts 22 and 24 each 180° toward the center part 23, substantially in the form of a 6 (see FIG. 6). The outer part 24 is, during the movement of the cover band 18, moved towards the web of packaging material 11, of the supply holder 27, and folded back 180° (see FIG. 7). Thereafter the cover band 18 is guided together with the center part 23, which still abuts part 22, for the purpose of carrying along the margin of the still endless web of packaging material 11; the same is pressed thereagainst by means of conveyor rolls which are not shown. Thereafter the cover band 18 is guided in such a manner, by means of conventional rolls which are also not shown, so that the same telescopes the packaging material along one of its cutting edges initially in "V" form and thereafter in a "U" shape manner (see FIGS. 8 and 9).

The U-form shaped cover band 18 which surrounds the cutting edge of the web of packaging material, is then heated to a suitable weld temperature which is accomplished at a station which adjoins the processing station 2. Preferably warm air is utilized which has been heated by means of heat resistors 31, with the air being discharged out of one or more jets 32 (see FIG. 10).

The cover band 18 which has been heated in such a manner, is then pressed at the next processing station 3, by means of known press rollers 33 on both sides against the packaging material 11 (see FIG. 11).

At the next following processing station 4, the cover band and the enclosed cutting edge of the packaging material 11, are cooled in accordance with this invention. The cooling is preferably accomplished by means of one or more jets 34 which discharge a blast of air until the temperature is about at room condition (see FIG. 12).

Thereafter the packaging material 11 is formed in the conventional manner into a tubelike structure 26 at the next processing station 5, whereby the seam margins 17 and 25 which are provided for overlapping, and part 24 of the cover band 18, are softened by the application of heat. This application of heat upon seam margins 17 and 25 upon the packaging material, which are to be connected, may also be accomplished with the help of additional jets 32 which discharge a stream of hot air (see FIG. 13).

Along the next processing station 6, the heated zones of packaging material 11 and the cover band 18 are placed above each other by means of conventional forming shoulders (which are not shown) and are then pressed together by rolls 35 and 36, in such a manner, that an overlapping seam 16 is established (see FIG. 14).

As already initially noted, the cooling of cover band 18 along the processing station 4, enables the application of considerable pressure during the pressing of the overlapping seam 16 by means of press rolls 35 and 36, thus avoiding damage to the cover band 18 or a displacement of parts thereof between seam margins 17 and 25. Nevertheless, the invention makes it possible that the regions of packaging material 11 and of the cover band 18 which are to be sealed to each other to overlapping seam 16 can be heated to the most advantageous heat seal temperature thereby securing a sealtight and trouble-free overlapping seam 16.

The fabrication of the overlapping seam 16a according to FIG. 2 may be made in a corresponding manner as aforedescribed.

The endless tubelike structure produced in this manner and composed of a multilayer packaging material may be subdivided into container bodies by means of conventional devices 7 and thereafter further processed into packaging containers 10 which are then filled and closed (see FIG. 15).

Alternatively, the webs of the packaging material and the cover band 18 may be subdivided into blanks at one of the earlier process stations. Referring now to FIG. 3b, after the packaging material 11 and the cover band 18 have been heat sealed and pressure rolled together, at stations 2 and 3, the resulting single coherent web 11, 18 is subdivided and cut into blanks of the size of container 16 at station 3a, or, alternatively, such cutting step is performed at station 4a, i.e., subsequent to the cooling step performed at station 4, by means of conventional equipment, not shown.

At station 5a, the blank 11a, 18 is then heated proximate to the cover band and at the opposite transverse end as shown in FIG. 16, by means of a blast of hot air from jet 32 heated by heating element 31.

A two-prong folding tool 42, 43 pivotable about axis 40 and provided with an elastic head 41 then places and biases the blank 11a, 18 around and elastically against a forming mandrel 45, see station 6a and FIG. 17. A drive 40 in engagement with tool 43 effects the pivotable movement and a pressure tool 46 arranged above the mandrel, proximate to seam margins 17 and 25 exerts the required pressure to seal or weld the margins 17, 25 and the interposed cover band 18 together.

In case the packaging container 10 is expected to be exposed to moisture during transport or storage, the cutting edge of seam margin 25 may also be protected by means of an extension of forward portion 24 of cover band 18. For this purpose, the forward portion 24 of the cover band 18 is extended from the inner side of the container between the seam margins 17 and 25 to the outside thereof, and is then folded around seam margin 25 and sealingly secured thereto. The extended part 24 of cover band 18 projecting to the outer side of the packaging container 10 may also be folded 180° around itself in the same way as on the inner side and as more particularly shown in FIG. 1a.

The tubelike container is then provided, in the conventional manner, with top and bottom covers, not shown.

While there have been described what are at present considered to be the preferred embodiments of this invention, it will be obvious to those skilled in the art that various changes and modifications may be made therein without departing from the invention, and it is aimed, therefore, in the appended claims to cover all such changes and modifications as fall within the true spirit and scope of the invention.

What We claim is:

1. In a tubelike packaging container composed of a multilayer packaging material having an inwardly and an outwardly facing seam margin in overlapping and spaced relationship to each other; a multilayer cover band having a forward end interposed, at least in part, between said seam margins and an intermediate and rear portion telescoped around the cutting edge of the inwardly facing seam margin, said rear portion of the cover band being folded 180° against itself with the folded portion abutting the inwardly facing seam margin.

2. A packaging container according to claim 1, wherein said cover band comprises a carrier foil, and a layer of plastic material weldable to the inwardly facing layer of the outer seam margin.

3. A packaging container according to claim 1, wherein said cover band comprises a carrier foil, and a layer of plastic material weldable to the outwardly facing layer of the inner seam.

4. A packaging container according to claim 2, wherein said layer of plastic material is also weldable to the inwardly facing layer of the inner seam.

5. A packaging container according to claim 2, wherein both sides of the carrier foil of the cover band are covered with a layer of plastic material.

6. A packaging container according to claim 1, wherein said carrier foil of said cover band is composed of a metallic material.

7. A packaging container according to claim 6, wherein said metallic material is essentially aluminum.

8. A packaging container according to claim 5, wherein said carrier foil is composed essentially of aluminum.

9. A packaging container according to claim 1, wherein each of the two folded legs of the rear portion of the cover band and the forward portion of the latter all have substantially the same width.

10. A packaging container according to claim 1, wherein the sum of the width of said forward portion and the inwardly folded leg of the rear portion of the cover band along the edges of the latter is less than the width of said intermediate portion.

11. A packaging container according to claim 1, wherein said forward portion of said cover band is telescoped around the cutting edge of the outer seam margin in U-shaped fashion and is sealed to the latter.

12. A packaging container according to claim 11, wherein the telescoped part of said forward portion is folded 180° against itself with the folded leg facing the outward face of the outer seam.

13. A packaging container according to claim 1, wherein the cutting edge of said forward portion is located remote relative to the cutting edge of the outer seam margin, and the inner seam margin is located, in part, coplanar with said forward portion in the area between the terminal edges of the forward portion and said outer seam margin.

14. A packaging container according to claim 13, wherein intermediate portions of said inner seam margin between the cutting edge thereof and the portion coplanar with the forward portion of the cover band, is arranged askew relative to the two contiguous parts of the seam margin.

15. A packaging container according to claim 13, wherein the inner face of the inner seam margin is in contact with and sealed to the inner and outer face of the cover band rear portion.

16. A packaging container according to claim 13, wherein the width of the two legs constituting the folded rear portion of the cover band is significantly unequal.

17. Method for making a packaging container according to claim 1, comprising the steps of: welding the cover band to and around the cutting edge of the inner seam margin; intermediately cooling said inner seam; and heat sealing upon the outwardly extending face of the cover band to the outer seam margin.

18. Method according to claim 17, wherein during said intermediate cooling step the cover band and inner seam margin are cooled down substantially to room temperature.

19. Method according to claim 17, wherein said cover band is initially, prior to said welding, provided with two longitudinally extending grooves, and thereafter is folded twice 180° around said grooves; one of the folds is opened again, and the cover band is then placed with this opening around the inner seam margin.

20. Method according to claim 17, wherein the packaging material and said cover band are produced from a continuous web; and subdividing said web into separate container bodies subsequent to said last heat sealing step.

21. Method according to claim 17, wherein said packaging material and cover band are produced from a continuous web; and subdividing said web subsequent to the step of welding said cover to said inner seam but prior to sealing said cover and said outer seam margin.